Dec. 30, 1969  A. NELSON  3,486,245
ARITHMETIC MUSICAL PLAYING DEVICE
Filed Nov. 13, 1967  7 Sheets-Sheet 1

INVENTOR.
ARTHUR NELSON

Dec. 30, 1969     A. NELSON     3,486,245
ARITHMETIC MUSICAL PLAYING DEVICE
Filed Nov. 13, 1967     7 Sheets-Sheet 2

INVENTOR.
ARTHUR NELSON

INVENTOR.
ARTHUR NELSON

Dec. 30, 1969    A. NELSON    3,486,245
ARITHMETIC MUSICAL PLAYING DEVICE
Filed Nov. 13, 1967    7 Sheets-Sheet 4

INVENTOR
ARTHUR NELSON

Dec. 30, 1969      A. NELSON      3,486,245

ARITHMETIC MUSICAL PLAYING DEVICE

Filed Nov. 13, 1967      7 Sheets-Sheet 5

INVENTOR.
ARTHUR NELSON

United States Patent Office 3,486,245
Patented Dec. 30, 1969

3,486,245
ARITHMETIC MUSICAL PLAYING DEVICE
Arthur Nelson, Rte. 4, Coshocton, Ohio 43812
Filed Nov. 13, 1967, Ser. No. 682,385
Int. Cl. C09b 19/02, 7/00
U.S. Cl. 35—31
10 Claims

ABSTRACT OF THE DISCLOSURE

An educational device for instructing a child in simple arithmetic problems embodying a housing having a card receiving and supporting surface. The housing containing a plurality of upstanding pin receiving sleeves which project outwardly above the supporting surface. Each sleeve supports a pair of opposed contacts at a different elevation thereon and in series electric connection with a battery and an electrically operated music playing instrument both contained within the housing. The card is provided with a plurality of spaced openings corresponding in dimensions to the sleeves and to the position and spacing thereof so as to fit thereover when placed on the supporting surface and printed on the card adjacent each opening is an arithmetic problem. A plurality of headed pins are worked on the heads thereof with the answer to each of the problems and each pin is provided with a conducting collar at a different elevation corresponding with the different elevations of the opposed contacts on the sleeves. Selection by the child of the proper marked pin for the correct answer to a problem and insertion of the pin in the sleeve adjacent to the problem on the card will establish a proper mating of the pin with the sleeve to effect closing of the circuit between the opposed contacts on the sleeve. On the correct completion of all the problems on the card and the corresponding insertion of the proper pins to mate with their respective sleeves will effect a complete closing of the entire circuit and cause the musical instrument to play. This will audibly indicate to the child that he has correctly solved all of the problems and he is rewarded by the playing of the tune delivered by the music instrument.

This invention relates to an educational device or game particularly to be used by a child in learning simple problems in arithmetic.

It is accordingly the primary object of this invention to provide a device embodying a housing having a top surface section for receiving a card thereon presenting a series of arithmetic problems either in addition or multiplication, the housing containing an electric music playing instrument and a series of electric contacts corresponding in number to the number of problems on the card, such that with the selection of a marked pin showing the correct answer for one of the problems from a group of pins, the proper placement of each pin in a receiving sleeve in the housing for the particular problem solved will on the correct placement of all the pins for all the problems on the card cause the music playing instrument to operate and play a tune that will indicate to a child working the device that he has correctly answered all the problems on the card and reward him by the playing of the tune.

Another object of this invention is to provide the housing with a base and a removable cover detachably secured hereto, the base being compartmentized with one compartment receiving a plurality of upstanding sleeves each for the reception of a marked playing pin, another compartment receiving an electric music playing device and a third compartment receiving one or more electric batteries.

A still further object of the invention is to have each of the pin receiving sleeves fixed to the base and with their upper end portions projecting through top surface section of the housing cover, each sleeve carrying a pair of opposed contacts and electrically connected in series with the battery and music playing instrument.

Yet another object of the invention is to have the opposed contacts differently positioned on each sleeve, and to provide the playing pins with conductor collars similarly differently positioned on each pin such that for each sleeve there will be at least one pin that will correctly mate with the sleeve so that the conductor collar thereof will close the circuit between the opposed contacts on the sleeve.

Another object of this invention is to provide the top surface section of the housing cover with an upstanding perimetral flange to insure proper placement of the card on the top surface section, the card having openings provided therein to receive the projecting ends of the sleeves.

Another object of this invention is to set forth the arithmetic problems in individual boxes at the top of the card and to place each problem thereon adjacent a selected opening in the card, the answer to a specific problem determining the selection of the properly marked pin for insertion into the sleeves.

Another object of this invention is to set forth the arithmetic problems in individual boxes at the top of the card and to place each problem therein adjacent a selected opening in the card, the answer to a specific problem determining the selection of the properly marked pin for insertion into the sleeve projecting through the opening adjacent to the specific problem.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

FIGS. 9, 10 and 11 show the printed cards used in the playing of the device, each card presenting a different series of arithmetic problems.

Figure 1:
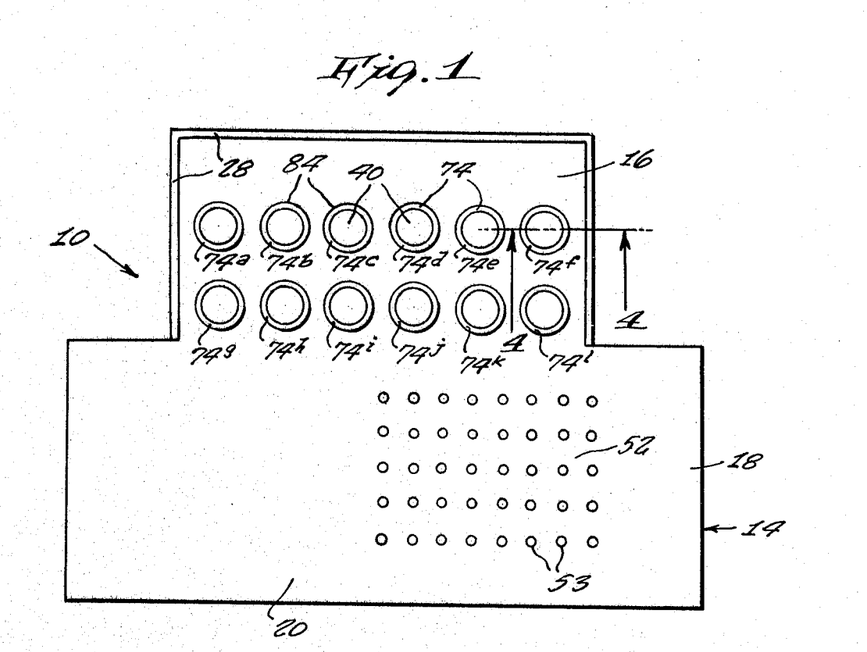
FIG. 1 is a top plan view of the arithmetic musical playing device.
Figure 2:
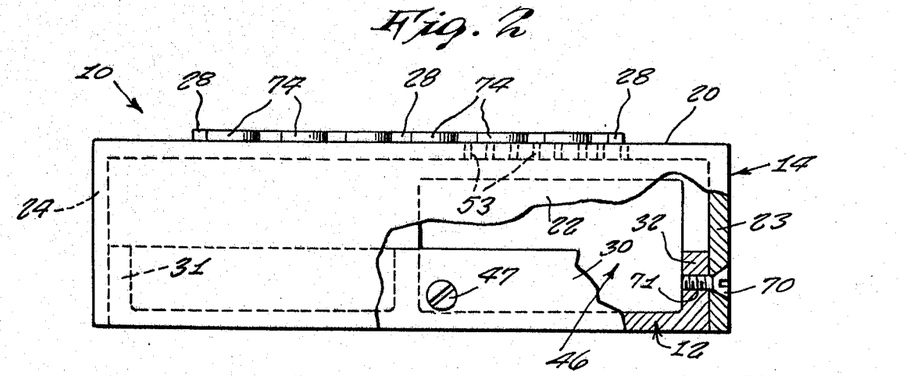
FIG. 2 is a front elevational view of the device.

Referring in detail to the drawings the arithmetic and music game device 10 consists of a box embodying a base 12 and a housing cover 14, see FIGS. 1 and 2. The housing cover 14 is of rectangular shape having a forward section 16 and a rear section 18 of reduced length and positioned centrally between the end sides of the forward section 18. The forward and rear sections 16, 18 provide a flat planar top wall 20 for the housing cover 14 integrally joined along its edges with a continuous depending vertical front wall 22, side walls 23, 24, and rear wall 26 of uniform height throughout. Projecting a short distance above the surface of top wall 20 along the edges of rear section 16 is a rib or flange 28 for a purpose to be hereinafter described. Preferably the entire housing cover 14 is made of a suitable molded plastic material.

The base 12 is also made of a suitable molded plastic material and is shaped complemental to the inside dimensions of the housing cover 14 such that the cover portions of the walls of the housing cover 14 will telescope over the base 12 in a sliding relationship between the edge surfaces of the base 12 and the inside surfaces of the housing cover walls, see FIG. 2. Extending integrally upwardly from the upper surface of the base 12 along the edges of the forward section 18a of the base 12 is a continuous front wall 30, side walls 31, 32 and rear walls 33, 34 which extend part way inwardly of the side edges of rear section 16a of the base 12, see FIG. 3. The walls 30, 31, 32, 33 and 34 are of a uniform height and substantially half the height of the housing cover walls. A vertical partition between and parallel to walls 31 and 32 on the base 12 extends rearwardly from the front wall 30 and terminates between the opposed ends of walls 33, 34. At the rear edge of base section 16a there is provided an integral upstanding wall 36 corresponding in height and thickness to the front wall 30. Integral with the base 12 and joining the rear wall 36 with the opposed ends of the walls 33, 34 are reinforcing ribs 38, 39. The flat base 12 with its integral walls and ribs is thus exceptionally strong and rigid. Provided on the base 12 and located in the rear section 16a are two parallel rows of equally spaced upstanding bosses 40, there being six bosses in each row for a purpose to be hereinafter described.

Figure 3:
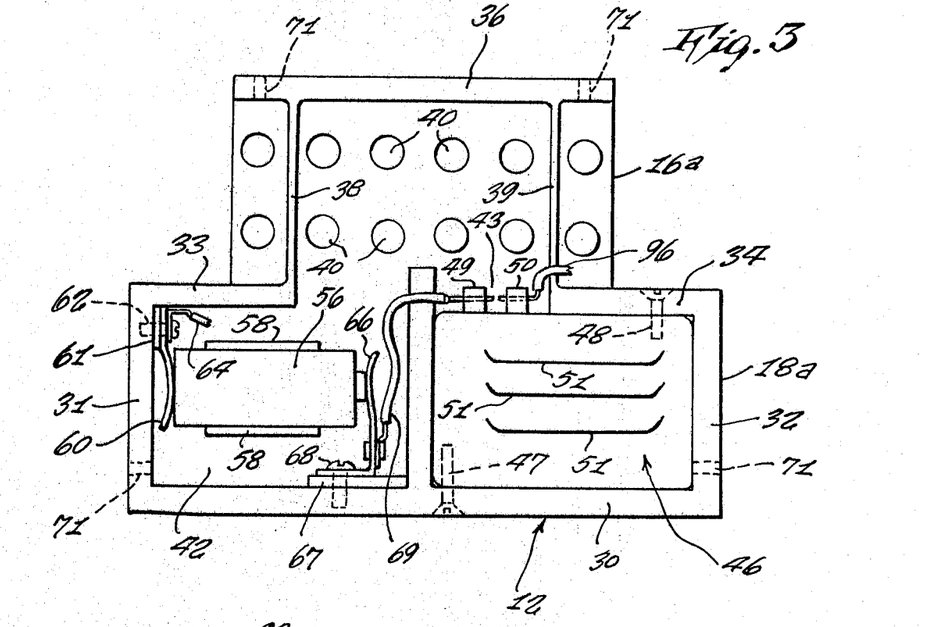
FIG. 3 is a top plan view of the base of the device.

The vertical partition between walls 31 and 32 divides the forward base section 18a into two compartments 42, 43. Compartment 42 serves as a battery containing compartment and compartment 43 receives therein an electrically operated music instrument 46 of any desired type, preferably one that will play a short melody or a plurality of short melodies in sequence. The music instrument 46 is securely and removably held in compartment 43 by screws 47, 48 which extend respectively through walls 30, 34 into engagement with parts (not shown) of the housing of the music instrument. Provided on the music instrument 46 are a pair of electric conductor binding parts 49, 50. As seen in FIG. 3, the sound outlets 51 of the music instrument are at the top thereof and free of any obstructions and are positioned in registry with the perforated zone 52 in the top wall 20 of the housing cover 14. The melody produced by the music instrument 46 is thus projected outwardly through the perforations 53 in zone 52.

The battery compartment 42 contains one or more batteries 56, only one being shown in FIGURE 3. The battery 56 is held against lateral movement by the parallel partitions 58, 58 formed integral with the base 12. A leaf spring contact 60 is seated on pad 61, and is secured to side base wall 31 by screw 62 which also serves to electrically secure one end of conductor 64 to the contact 60. Another leaf spring contact 66 is seated on pad 67, and is secured to front base wall 30 by screw 68 which also serves to electrically secure one end of conductor 69 to the contact 66. The contacts 60, 66 engage the positive and negative poles of the battery 56 and by their spring pressure serve to hold the battery against longitudinal movement. It is to be understood that the number arrangement, location and mounting of the spring contacts 60, 66 may be varied, and that the specific form and use of battery as shown in FIG. 3 is merely exemplary.

The housing cover 14 as hereinabove indicated telescopes over the base 12. As seen in FIG. 2, the bottom edge of the housing cover walls lies flush with the bottom surface of the base 12. Screws 70 extend through the housing cover walls at appropriate locations and are received in threaded openings 71 in the walls of the base 12 to removably hold the housing cover in fixed relation to the base 12.

Figure 4:
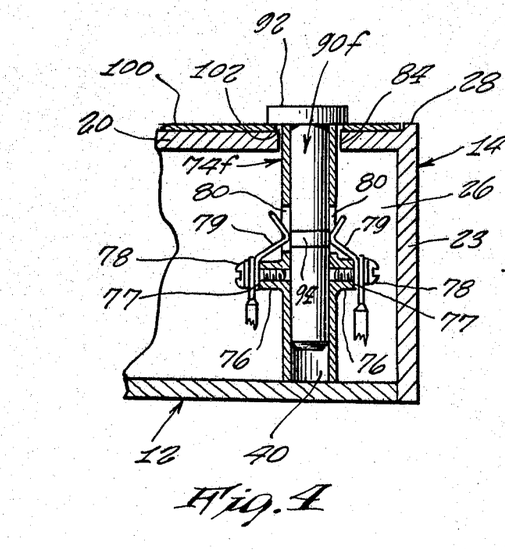
FIG. 4 is a vertical detail sectional view taken on line 4—4, FIG 1.
Figure 5:
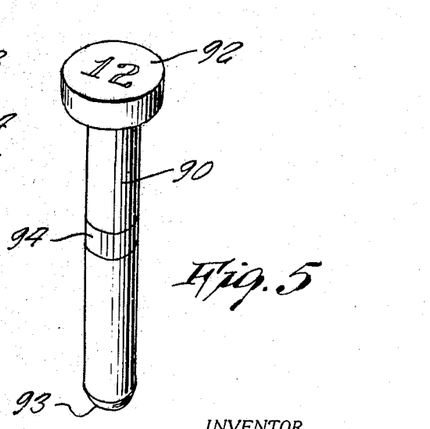
FIG. 5 is a perspective view of a marked pin used in the playing of the device.

Arrangement for securement with the bosses 40 on base 12 are the positioning sleeves 74, see FIG. 4 there being a sleeve 74 for each boss 40. The sleeves 74 are formed of a suitable molded plastic material of tubular form and with a sufficient wall thickness to insure high strength and rigidity. The lower end portion of each sleeve surrounds its associated boss and is secured thereto in any desired manner as by threaded interengagement, a press fit or adhesive. The lower terminal edge of the sleeve 74 engages the upper surface of base 12 and the axis of the sleeve is normal to the base. A pair of diametrically opposed exterior bosses 76 are integrally formed on each sleeve, each boss having a flat outer face 77 and a threaded bore for the reception of a binding screw 78. Positioned on each boss is a leaf spring contact 79, the lower end thereof being seated on the boss face 77 and secured thereto by the screw 78. One end of a conductor has electric contact with each spring contact 79, 79 and is fixedly held connected thereto by the head of its associated screw 78. Each spring contact 79 is formed V-shaped adjacent its upper end with the apex of the V-portion of both spring contacts in opposed horizontal alignment and projecting into the sleeve 74 through opposed slots 80, 80 provided in the wall thereof, for a purpose to be hereinafter described.

Referring to FIG. 1, it is seen that there are twelve sleeves 74, one for each base boss 40 which positions the same and to which the lower end of its associated sleeve is secured as described hereinabove. The top 20 of the rear section 16 of housing cover 14 is provided with two parallel rows of openings 84 each having a diameter slightly larger than the outside diameter of the sleeve 74, see FIG. 4. The sleeves 74 are each of the same length and of such a length that the upper terminal end portion thereof will extend upwardly through the openings 84, preferably for a distance not exceeding the height of rib or flanges 28, see FIG. 2, when the housing cover 14 is in position and secured to base 12. Since the openings 84 are slightly greater than the diameter of the sleeves 74 it is seen that the upper end of the sleeves cannot bind in the openings 84, thus permitting each removal of the housing cover 14.

The vertical position of exterior bosses 76, contacts 79 and sleeve slots 80 with respect to each sleeve is different for each of the sleeves 74, being highest for sleeve 74a at the left of the rear row (viewing FIG. 1) and lowest for sleeve 74L at the right of the front row; the vertical position decreasing preferably by equal increments from sleeve 74a to sleeve 74L, all this for a purpose to be hereinafter described.

Utilized for mating positioning within each sleeve 74 is a pin or rod 90 made of a suitable non-conducting plastic material and of a diameter slightly less than the inside diameter of the sleeve 74 so as to have a relatively loose fit therein. Each pin 90 is provided at its upper end with an enlarged diameter head 92 having a flat undersurface, and the length of each pin from said flat undersurface to the lower free terminal end thereof equals substantially the length of the sleeve 74 from its top edge to the top of boss 40, see FIG. 4. Preferably the lower end of the pin 90 is chamfered as at 93 to facilitate insertion of the pin into the sleeve. Provided on each pin 90 is a narrow metal conduct annular collar 94 that is recessed on the pin such that its outer surface is flush with the cylindrical surface of the pin. As with the vertical location of contacts 79 on each of the sleeves 74, the vertical position of conductor collar 94 on each pin 90 (from its lower end) varies in a corresponding manner. Thus, each sleeve 74 (from 74a to 74L) has its own mating pin 90 in which the conductor collar 94 will be positioned in horizontal alignment with the contacts 79 so as to close the circuit therebetween as clearly shown in FIG. 4, for a purpose to be hereinafter described.

Figure 6:
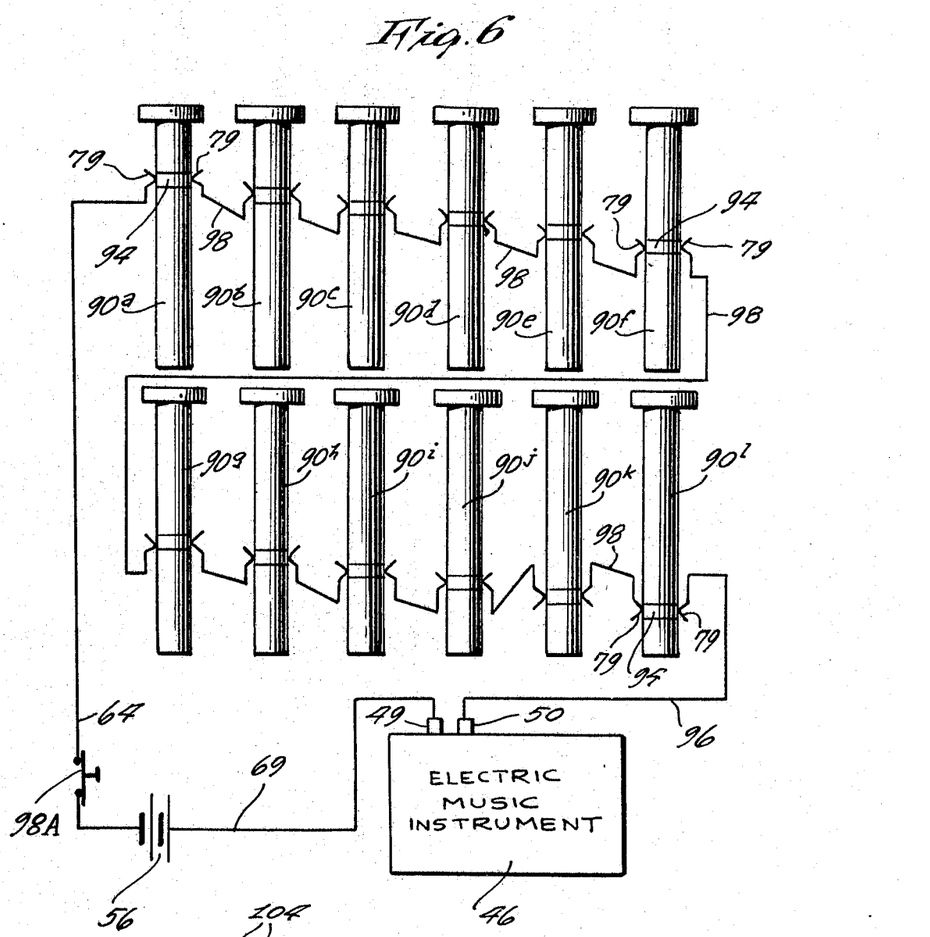
FIG. 6 is an electric diagram of the device showing the relationship and connections of the electrical components thereof.

FIG. 6 illustrates diagramatically the electric connections between the component parts of the Arithmetic Musical Playing Device. It is to be noted that the pins 90 are herein identified as 90a to 90L inclusive for corresponding mating with the sleeves 74a to 74L so designated in FIG. 1. The pairs of contacts 79 of each sleeve are shown in engagement with the conducting collar 94 of the pin mating with the sleeve. Conductor 64 connects one side of battery 56 to one contact 79 for pin 90a. Conductor 69 connects the other side of the battery 56 with binding post 49 of the music instrument 46. Conductor 96 connects the other binding post 50 of the music instrument to one contact 79 for pin 90L. The intervening pins 90b to 90k inclusive are interconnected in series by conductors 98 in the manner as shown. Thus, with all pins 90a–90L properly mating with their respective sleeves (as will be hereinafter described) a closed circuit is established between the battery and the musical instrument which latter will become operative to play its melody. If desired a switch 98A of any suitable type may be employed to break the circuit in the event it is desired to stop the instrument from playing when all the pins are properly placed in their sleeves. Obviously with the device so equipped with switch 98A the same must be closed prior to the start of playing the arithmetic game. It is to be noted that the pairs of opposed contacts 79, 79 carried by the sleeves 74k, 74L receiving pins 90k, 90L are reversed, i.e., extend downwardly. This is because of their low position at the lower end of the sleeves. In this case the boss supports 76, see FIG. 4, are located above the slots 80.

Figure 7:
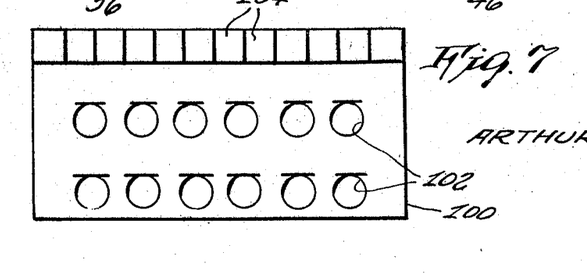
FIG. 7 is a plan view of a card used in the playing of the device, the card being blank.

A blank form of problem card 100 utilized in playing the arithmetic game is shown in FIG. 7. The card 100 is made of stiff cardboard and is dimensioned in length and width to fit within the rectangular space defined by the flanges 28 on the top portion 20 of the rear section 16 of the housing cover 14, see FIGURES 1 and 4. The card 100 is provided with two rows of circular cut-out openings 102, each of a diameter slightly larger than the diameter of sleeve 74. With the card 100 placed in position it is seen that the projecting ends of sleeves 74 will lie within openings 102. Preferably the height of flange 28, the thickness of card 100 and the height of the projecting end of each sleeve 74 above surface of top 20 are the same so as to lie in the same horizontal plane, see FIG. 4.

Figure 9:
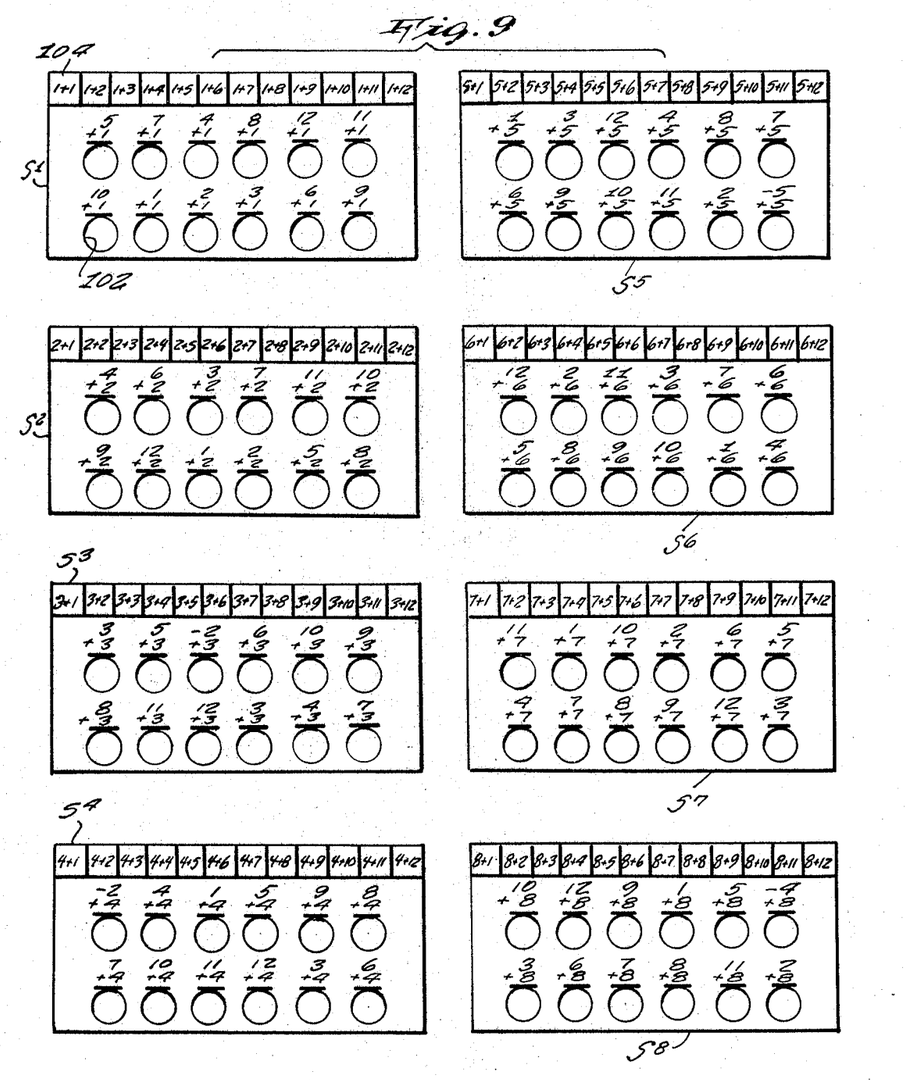
Figure 10:
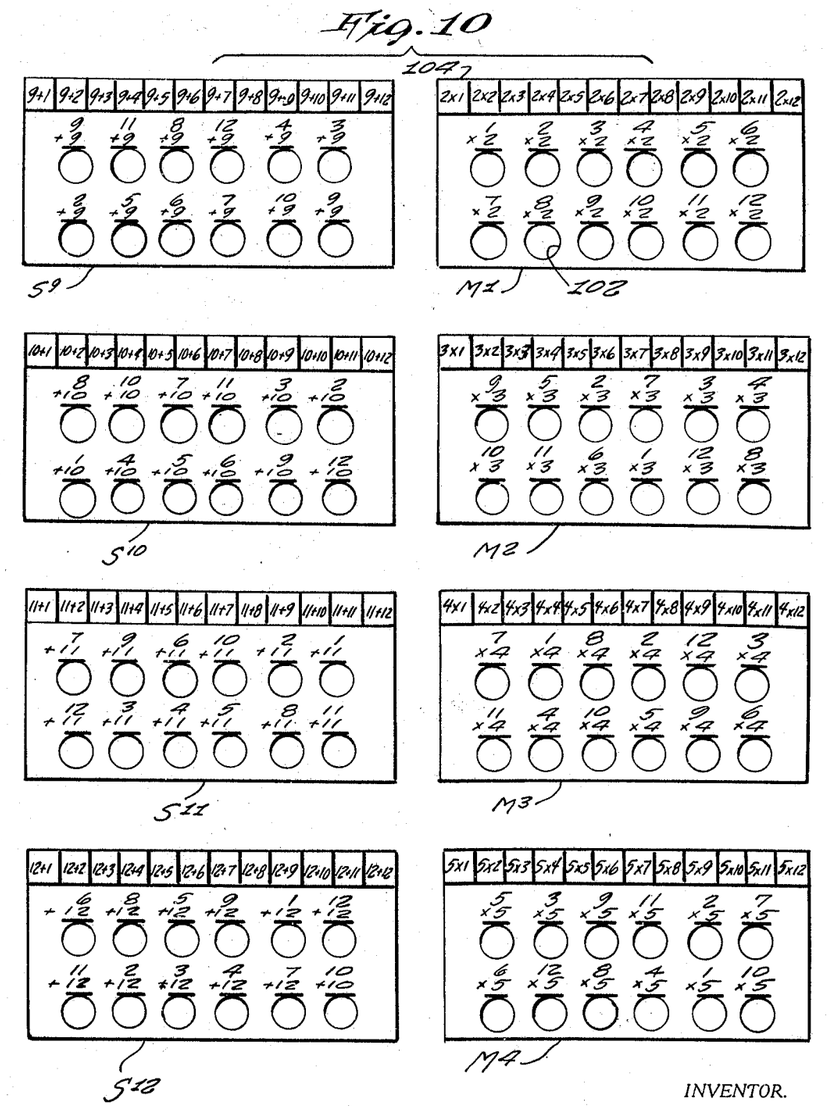

The top of card 100 is ruled to provide twelve boxes or spaces 104 in which are printed an individual problem in simple arithmetic, addition or multiplication, see cards FIGURES 9, 10 and 11. Adjacent and above each opening 102 there is imprinted a problem as indicated in one of the spaces above but not in the same sequence, see cards FIGURES 9, 10 and 11.

Figure 8:
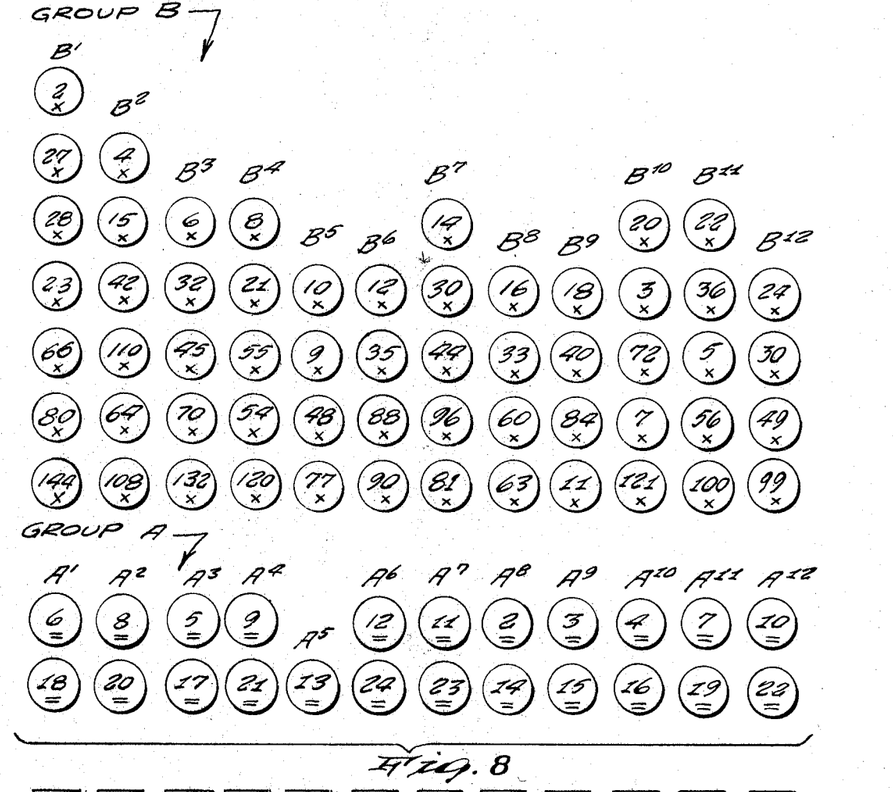
FIGURES 8 and 8A show the charting of pins into Groups A and B.
Figure 8A:
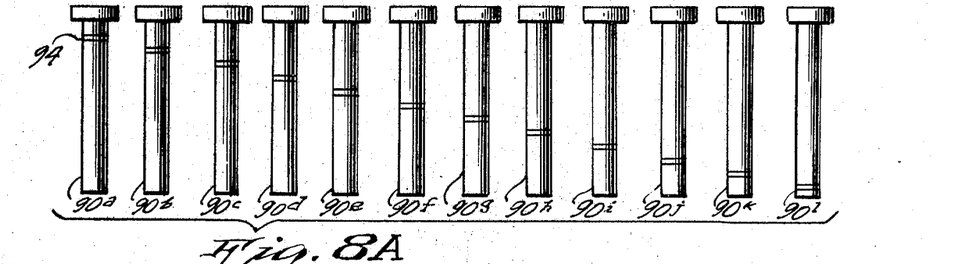

For use with the cards there are two groups of pins 90 each having on the top surface of the head thereof a numeral and an identifying indicia, "X" or "=," directly therebeneath. FIGURE 8 and 8a charts the two groups of pins 90 as Group A utilized for problems in addition and Group B utilized for problems in multiplication. Group A has 23 pins numbered "2" to "24." Group B has 58 pins each numbered as shown. It is to be noted from the chart that the pins of Groups A and B are arranged in twelve vertical aligned rows with each vertical aligned row of pins in vertical alignment with a pin in the horizontal row of twelve pins designated 90a to 90L inclusive. Thus, the pins in vertical aligned columns $A^1$ and $B^1$ are each identical with pin 90a in the same aligned column as to the height location of the conductor collar 94 thereon. In a like manner the pins in the next column $A^2$–$B^2$ correspond with pin 90b, and so on, through aligned column $A^{12}$–$B^{12}$ in which the pins thereof correspond with pin 90L.

OPERATION

The operation of the Arithmetic Musical Playing Device is as follows referring to FIGURES 8, 9, 10 and 11.

The arithmetic features of the device embody set problems in addition (sums) and multiplication.

In FIGURES 9 and 10 cards $S^1$ to $S^{12}$ inclusive each relate problems in addition using only the numerals 1 to 12. Thus, in card $S^1$ there is set forth in the boxes 104 the problems of adding to the numeral 1, the numerals 1 to 12, setting forth twelve distinct problems. Each of the circular openings 102 in the card $S^1$ has printed thereabove one of the problems but in an apparent mixed order.

A child in playing the game and in working out the problems will place card $S^1$ on the top of rear section 16 of the housing cover 14 within flanges 28 and the projecting ends of sleeves 74 seated in openings 74a–74L. Starting with the first sum "5+1" the child will select for the correct answer the pin of Group A having on its head the numeral 6. The "=" sign below the numeral 6 identifies the pin as an addition pin of Group A. This pin "6" is then inserted by the child into the sleeve 74a below the problem (5+1). It will be noted that this pin "6" in column $A^1$ corresponds with pin 90a, see chart FIG. 8 and when fully inserted into sleeve 74a will have its conductor collar 94 closing the circuit between spaced contacts 79, see wiring diagram FIG. 6. No other pin can give the correct answer to the problem (5+1) and any other pin inserted from Group A will not establish a connection between contacts 79 on sleeve 74a. In a like manner a pin from Group A is selected for the correct answer for each of the remaining problems on the card and appropriately inserted in the proper sleeve indicated by the problem. Thus, the last problem on card $S^1$ is "9+1." The correct pin in Group A is the one with numeral "10" on its head and being in column $A^{12}$ is seen to correspond with pin 90L. It therefore is properly insertable into sleeve 74; see FIG. 1. If all the prior eleven problems have been correctly solved with the correct pin inserted in the proper sleeve, the last pin for the last problem will on its complete insertion into the proper (and remaining sleeve) completely close the circuit between the battery 56 and the musical instrument 46 to effect operation thereof to play a melody. The playing of the melody or tune will audibly establish to the child that he has correctly solved all the twelve problems on card $S^1$. Removal of one pin will open the circuit and cause the musical instrument to stop playing.

In a similar manner the remaining addition cards $S^2$ to $S^{12}$ inclusive may be played with a like selection from Group A of the correct pin for insertion into its proper mating sleeve to effect playing of the melody or tune when all twelve pins are correctly selected and inserted.

The twelve pins of Group A numbered "2" to "24" inclusive provide the proper answers for each of the twelve addition problems on each of the twelve cards and when a pin correctly inserted into the right sleeve for the problem solved will by virtue of the position of conductor collar 94 thereon close the circuit between the opposed contacts on the associated sleeve.

Cards $M^1$ to $M^{11}$ inclusive set forth multiplication problems and require selection of pins from Group B for the correct answer to a selected problem. Thus, in card $M^1$ there is set forth in boxes 104 the problems of multiplying the numeral 2 by numerals 1 to 12 inclusive, setting forth twelve distinct problems. Each of the circular openings 102 in the card $M^1$ has printed thereabove one of the problems but in an apparent mixed order. Placement of the card $M^1$, solving the problems thereon, selecting the proper and correct pin from the pins in Group B and inserting the correct pin for each problem in its proper mating sleeve is exactly the same as described above with reference to the addition card $S^1$. Merely by way of illustration the problem on card $M^1$ of "6×2" requires selection of pin 12 from Group B. It is seen from the chart FIG. 8, that pin 12 in Group B is in column $B^6$ and corresponds with pin $90^f$. Accordingly this pin 12 is properly insertable in its mating sleeve $74^f$, see FIG. 1. Columns $B^1$ to $B^{12}$ inclusive show the pins of Group B giving all the correct answers to the twelve problems on each of cards M¹ to M¹¹ inclusive and also show their correspondence to pins 90a to 90L inclusive as related to sleeves 74a to 74L inclusive. The correct placement of all 12 pins for each "M" card in their associated sleeves will completely close the circuit between the battery 56 and the musical instrument 46 to effect operation thereof to play a melody which will audibly establish to the child that he has correctly solved all the twelve problems on the "M" card worked.

It is to be understood that in the use of the device the pins of Groups A and B may be either contained mixed in separate containers, one for addition and the other for multiplication problems, or the pins of both Groups A and B may mixed and contained in a single container as each pin is identified by either an "X" or an "=" sign. In any event the child is required to select the correct pin having the correct answer for a particular problem for insertion into its mating sleeve.

The novel features and the operation of this device will be apparent from the foregoing description. While the device has been shown and the structure described in detail, it is obvious that this is not to be considered limited to the exact form disclosed, and that changes may be made therein within the scope and the spirit of the invention.

Having thus set forth and disclosed the nature of this invention, what is claimed is:

1. An arithmetic musical playing device comprising:
   (a) a housing,
   (b) a flat supporting surface on the top of said housing,
   (c) a plurality of like guide means within said housing each carrying a pair of spaced contacts,
   (d) an electric music instrument within said housing,
   (e) conductor means series connecting the music instrument and said pairs of spaced contacts to a source of electric supply,
   (f) each said guide means extending through said housing top to project above said supporting surface,
   (g) indicia marking each guide means to correspond to a specific arithmetic problem,
   (h) a plurality of marked pins for insertion into said guide means each having marked thereon the answer to each specific problem,
   (i) a contact member on each marked pin,
   (j) each guide means and one of said marked pins respectively having the spaced contacts and contact member thereon arranged for mutual interengagement when said pin is inserted into said guide means with the arrangement different for each guide means and its mating marked pin,
   whereby
   selection of a marked pin bearing the correct answer to each problem identified by the indicia is inserted into the proper guide means to cause the contact member on each pin to engage each corresponding pair of spaced contacts on said guide means to close the circuit therebetween, thereby causing operation of the musical instrument when all the pins have been properly inserted and the problems correctly solved.

2. The arithmetic musical playing device of claim 1, wherein said housing comprises:
   (a) a flat base having a forward section and a rear sections,
   (b) a housing cover complemental in shape to said flat base having a top wall and depending vertical walls,
   (c) fastener means removably securing said housing cover to said base,
   (d) means mounting and confining said music instrument on the forward section of said base,
   (e) battery means providing the source of electric supply positioned and held on the forward section of said base, and (f) the indicia are marked on a card adjacent openings arranged to align with each of the guide means.

3. The arithmetic musical playing device of claim 2, wherein:
   (a) said flat supporting surface on the top of said housing is located on the rear section of said housing cover,
   (b) said flat supporting surface being rectangular, and
   (c) a continuous upstanding perimetral flange at the side and rear edges of said flat supporting surface defining the placement of said card thereon.

4. The arithmetic musical playing device of claim 3, wherein:
   (a) the vertical height of said flange and the projecting ends of said guide means are equal and correspond substantially to the thickness of the card.

5. The arithmetic musical playing device of claim 4, wherein:
   (a) each said guide means is a cylindrical sleeve,
   (b) means fixedly securing the lower end of each sleeve to the rear section of said base,
   (c) there being a plurality of circular openings in the rear section of said housing cover at said flat supporting surface, and
   (d) the upper terminal ends of said sleeves being positioned in said openings to project above said flat supporting surface,
   (e) there being a slight clearance in each said opening around its associated sleeve.

6. The arithmetic musical playing device of claim 5, including:
   (a) a pair of diametically opposed slots in each sleeve,
   (b) an exterior boss adjacent one end of each slot on said sleeve,
   (c) said spaced contacts comprising, a spring contact element seated at one end on each boss and having its other free end portion positioned in a slot to normally extend inwardly of said sleeve, and
   (d) fastener means securing a spring contact element to its associated boss and one end of a conductor to said spring contact element.

7. The arithmetic musical playing device of claim 6, including:
   (a) a flat enlarged diameter head on each marked pin carrying on its upper flat surface identifying indicia and a number which is the correct answer to an arithmetic problem on said card,
   (b) said pins being of a diameter such as to slidably fit within said sleeves, and
   (c) a conductor collar secured to each pin at an axially predetermined position thereon,
   (d) the outer surface of said collar being flush with the cylindrical surface of said pin.

8. The arithmetic musical playing device of claim 7, wherein:
   (a) each sleeve and a selected pin have a predetermined mating relationship with the opposed spring contact elements on a sleeve positioned to correspond with the position of the conductor collar on a pin such that on insertion of the pin in the sleeve the conductor collar will engage the contact elements to close the circuit therebetween, and
   (b) the mating positions of the sleeves and pins as to their contact elements and conductor collars being different for each mating pair.

9. The arithmetic musical playing device of claim 8, wherein:
   (a) said rear section of base and housing cover is of less length than said forward section,
   (b) the top surface of said forward section being coplanar with the flat supporting surface of said rear section, (c) there being openings in the top surface of said forward section to provide for audible projection therethrough of the music emanating from the music implement.

10. The arithmetic musical playing device of claim 9, wherein the securing means for the lower end of each sleeve comprises:
  (a) an integral upstanding cylindrical boss on the rear section of said base,
  (b) said sleeve at its lower end encircling said boss and secured thereto with the terminal end of the sleeve abutting the top surface of said base,
  (c) said sleeves and mating pins being formed of a rigid non-conducting plastic material.

References Cited

UNITED STATES PATENTS

| 1,617,272 | 2/1927 | Peterson | 35—31.3 X |
| 2,853,799 | 9/1958 | Magnussen et al. | 35—31.3 X |
| 2,892,267 | 6/1959 | Harvey | 35—9.1 X |
| 3,324,575 | 6/1967 | Higgins | 35—31 |

EUGENE R. CAPOZIO, Primary Examiner

WILLIAM H. GRIEB, Assistant Examiner

U.S. Cl. X.R.

35—9